United States Patent [19]
Deavenport

[11] Patent Number: 4,634,888
[45] Date of Patent: Jan. 6, 1987

[54] UNINTERRUPTIBLE POWER SUPPLY

[76] Inventor: Joe E. Deavenport, 5062 Edgeworth Rd., San Diego, Calif. 92109

[21] Appl. No.: 700,650

[22] Filed: Feb. 12, 1985

[51] Int. Cl.⁴ ............................................. H02J 3/32
[52] U.S. Cl. ....................................... 307/48; 307/64; 307/66
[58] Field of Search ............... 307/64, 65, 66; 363/37; 320/57, 59

[56] References Cited
U.S. PATENT DOCUMENTS
4,277,692  7/1981  Small ..................................... 307/66
4,488,057 12/1984  Clarke ................................... 307/66

Primary Examiner—William M. Shoop, Jr.
Assistant Examiner—Alfred F. Hoyte
Attorney, Agent, or Firm—Brown, Martin, Haller & Meador

[57] ABSTRACT

A method and apparatus for supplying continuous output power from at least one of two sources of input power. A rectifier circuit rectifies an AC current from an AC power source into a DC current. A first sensing circuit respectively provides first and second control signals in response to the input voltage provided by the AC power source. The first control signal is provided when the AC power source voltage is within a predetermined voltage range. The second control signal is provided when the AC power source voltage is outside the predetermined voltage range so as to inhibit the rectification of the AC current. An inverter circuit converts a DC current from a DC power source into an AC current which is then rectified into a DC current. A second sensing current, responsive to the first and second control signals, generates a third control signal which controls the magnitude of the output of the inverter circuit. A demodulator circuit converts the DC currents from the rectifier circuit and the inverter circuit into a continuous output AC current.

22 Claims, 10 Drawing Figures

UNINTERRUPTIBLE POWER SUPPLY

BACKGROUND OF THE INVENTION

I. Technical Field

The present invention relates to power supplies. More specifically, the present invention relates to a novel uninterruptible power supply (UPS) for supplying continuous output power from at least one of two sources of input power.

II. Background Art

Uninterruptible power supplies are used in applications where it is necessary that continuous power be supplied to a load. One such application of the uninterruptible power supply is in the field of medical equipment wherein if a loss of input AC power occurs, it is necessary that the equipment continue to function under standby power. Another application of the uninterruptible power supply is in computer equipment. In the event of an input AC power failure, standby power would permit the operator to continue computing without loss of data in volatile memories. In computer applications, the standby power must be applied such that the transition from the input AC poewr source to the standby power source does not cause a loss of data.

Previous applications of uniterruptible power supply have employed two techniques. The first technique is the "on-line" power supply wherein the AC input power is constantly applied to a battery through a battery charger. The battery supplies direct current to an inverter which outputs AC power at the same frequency and magnitude as the input AC power. The disadvantages of the "on-line" power supply is that two inverters are required, one to convert the input AC current and voltage to a DC current and voltage to charge the battery and another to convert the DC current voltage to an output AC current and voltage. Typically "on-line" power supplies require transformers which can be rather expensive, heavy, and large in size. "on-line" power supplies tend to be inefficient and generate large amounts of heat that must be dissapated.

Another technique used in uninterruptible power supplies is the "off-line" technique wherein AC power is supplied directly to the load and upon detection of a loss in input AC power, a battery powered inverter supplies output power to the load. Switching between input AC power and power supplied by a battery-powered inverter results in a transisitn time which may result in an instantaneous loss of power to the load. This temporary loss of power can result in the load function failure such as the loss of data stored in volatile computer memories. Typically, power supplies utilizing the "off-line" technique, generate a square wave output rather than the sinusoidal output required in many applications.

It is therefore, an object of the present invention to provide an uninterruptible power supply which eliminates the transition time between switching from one source of power to another source of power so as to supply continuous output power.

It is another object of the present invention to provide highly efficient uninterruptible power supply that is compact in size and weight.

SUMMARY OF THE INVENTION

The present invention provides for an apparatus and method for supplying continuous output power from at least one of two sources of input power. The present invention includes means for converting a first input current from a first source of power into a first unidirectional current and means for converting a second input current from a second source of power into a second unidirectional current. Means are included that is responsive to the first source of input power for being in a first state when the first source of input power provides the first input current at a voltage within a predetermined range of voltages and for being in a second state when the first source of power provides the first input current at a voltage other than a voltage within the predetermined range of voltages. Means are included that is responsive to the first and second states of the means responsive to the first source of input power for controlling the magnitude of the second unidirectional current, the means responsive to the first and second states controlling the magnitude of the second unidirectional current to a magnitude substantially less than the magnitude of the first unidirectional current in response to the first state and controlling the magnitude of the second unidirectional current to a magnitude substantially greater than the magnitude of the first unidirectional current in response to the second state. In addition, means are included that are responsive to the reference signal for converting at least one of the first and second unidirectional currents into a continuous output current.

The present invention provides for a circuit that will deliver a nominal 300 watt, 115 volt, 60 Hz, AC power output from a battery inverter or from an input AC power line. Input AC current from an AC power source is rectified by a switching network so as to provide a full wave rectification of the sinusoidal input AC current waveform. A reference signal, having a waveform phase locked with the input AC voltage waveform, is generated by an oscillator. A full wave rectified sinusoidal signal representative of the input AC voltage waveform is generated and compared to the full wave rectified waveform of the reference signal so as to provide a first control signal when the signal representative of the actual input AC voltage waveform has a first predetermined relationship with the full wave rectified reference signal waveform. A second control signal is generated when the signal representative of the input AC current waveform has a second predetermined relationship with the full wave rectified reference signal.

When the first control signal is generated, a first switching network, under the control of switching signals from a first switch signal means, allow the waveform of the input AC current to be full wave rectified. Timing of the switching signals from the first switch means is controlled by the oscillator.

Upon the second predetermined relationship occurring the first switching network is inhibited, in response to the second control signal, from generating the full wave rectified waveform of the input AC current. A second switching network is coupled to the output of the first switching network. The second switching network, under the control of switching signals from a second switch signal means provides demodulation of the full wave rectified waveform of the input AC current. The output of the second switching means provides AC power having a sinusoidal current waveform. Timing of the switching signals from the second switch means is controlled by the oscillator.

The full wave rectified reference signal waveform is also applied to a comparator which compares the waveform of a signal representative of waveform output from the first switching network and provides a signal to a pulse width modulator. The pulse width modulator provides pulse width control signals to a battery inverter which converts DC current from the battery to an AC current in addition to stepping up the voltage. In response to the first control signal, the pulse width modulator limits the output pulse width such that the magnitude of the output power provided by the inverter circuit is limited. In the AC mode of operation, the power provided by the battery inverter is limited to a small percentage of total output power provided by the uninterruptible power supply.

When the second predetermined relationship occurs and the second control signal is generated, all power supplied by the input AC power source is decoupled from the second switching network. The first control signal is removed from the pulse width modulator so as to remove the limitation on the width of the pulses output from the pulse width modulation. In this condition, the battery powered inverter is permitted to provide full output poewr from the uninterruptible power supply.

Energy recovery means are included such that when the battery inverter is supplying the output power, reactive power returned from the load is sensed and converted into energy which charges the battery. The energy recovery means also functions as a battery charger when the uninterruptible power supply is in the AC mode of operation.

In the present invention the battery inverter is continuously supplying a portion of the output power. In the AC mode of operation the battery inverter is supplying a small percentage of the output power. In the DC or battery mode of operation, the battery inverter is supplying all of the output power at a level established prior to the loss of input AC power. The continuous supplying of output power from the battery inverter eliminates potentially damaging transistions from one source of power to another.

BRIEF DESCRIPTION OF THE DRAWINGS

These and other features, objects, and advantages of the invention will be more fully apparent from the detailed description set forth below and taken in conjunction with the drawings in which like reference characters correspond and wherein.

DETAILED DESCRIPTION OF THE PREFERRED EMBODIMENTS

Figure 1A:
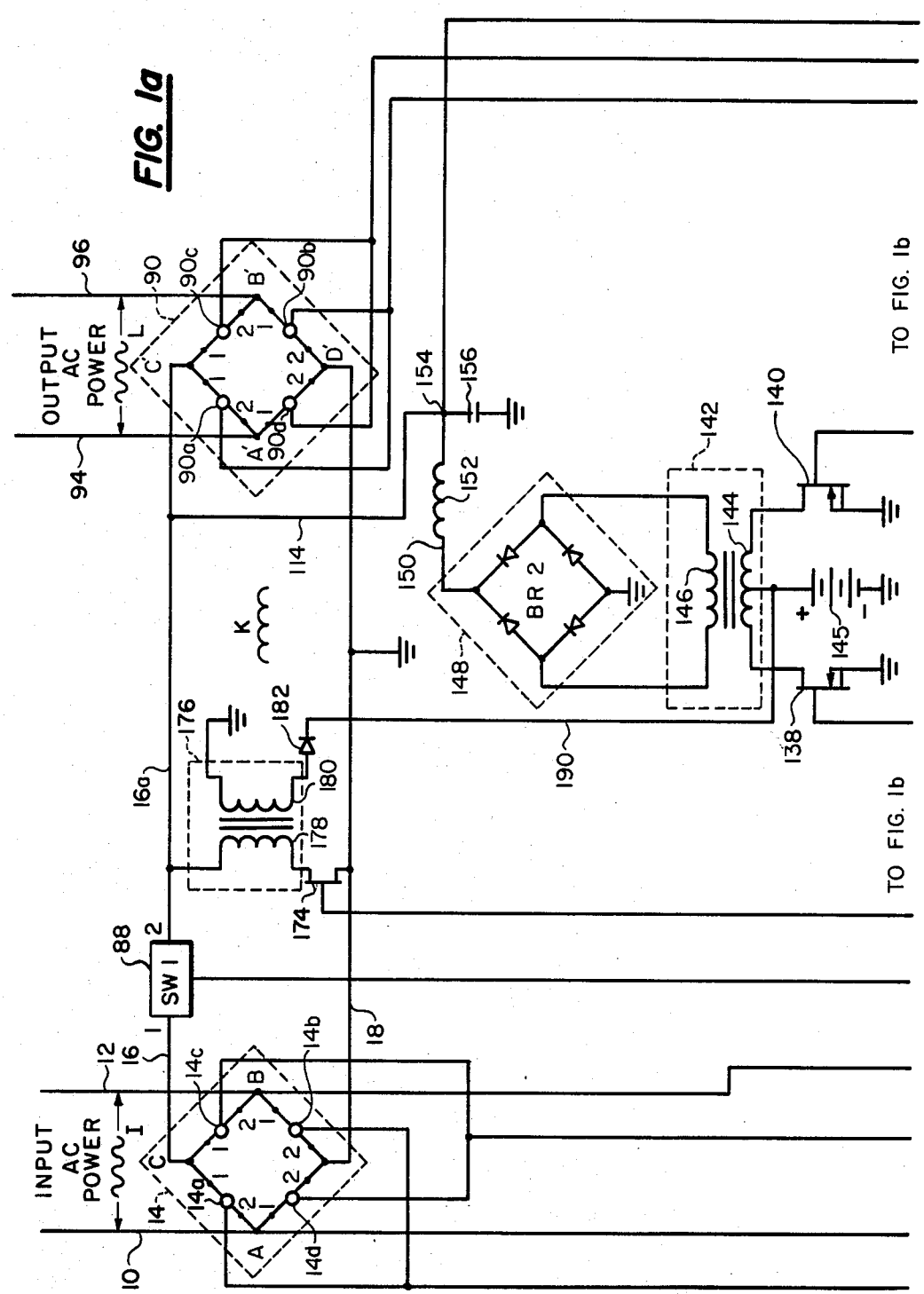
FIG. 1a, 1b and 1c are a schematical diagram of the uninterruptible power supply of the present invention.
Figure 1B:
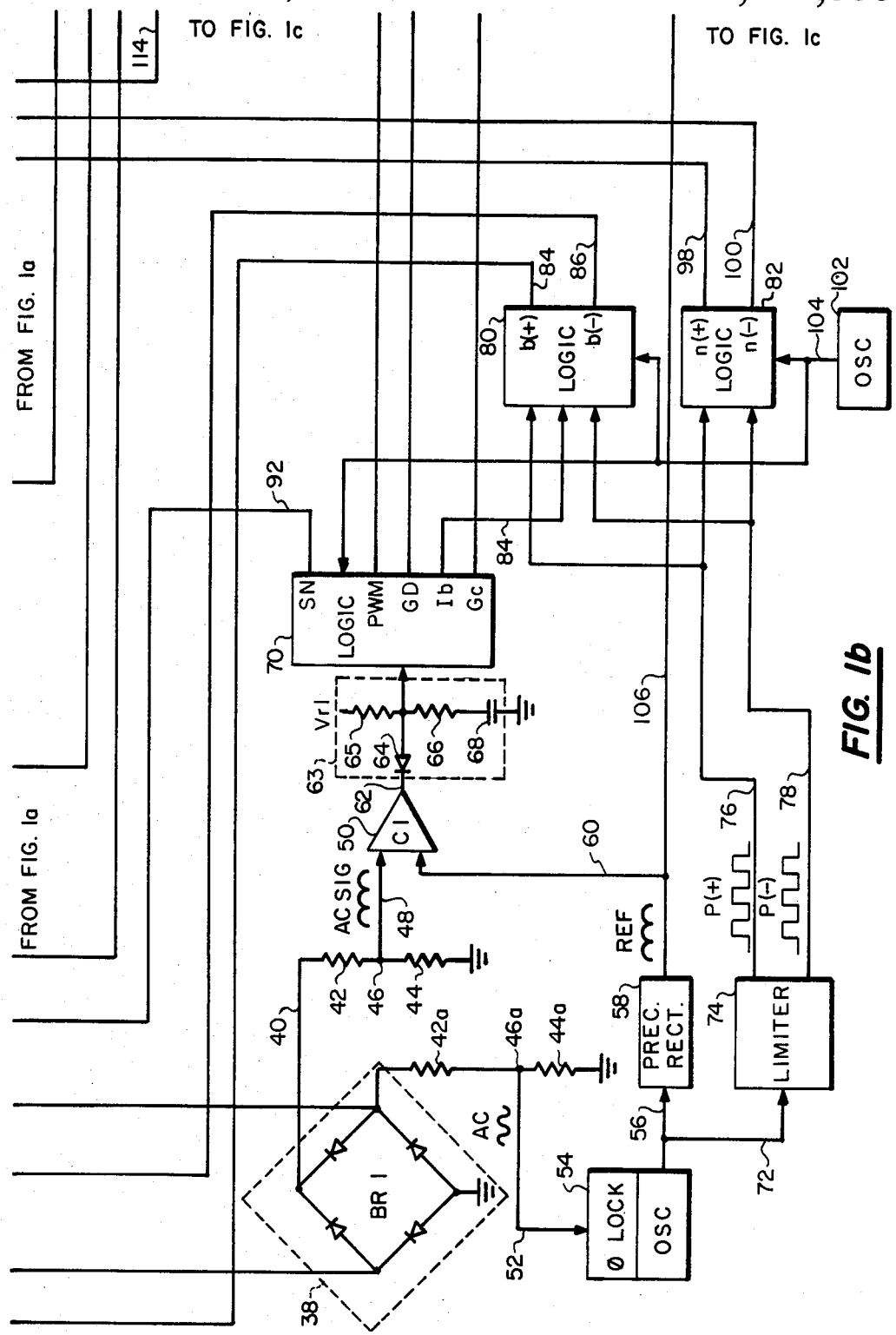
Figure 1C:
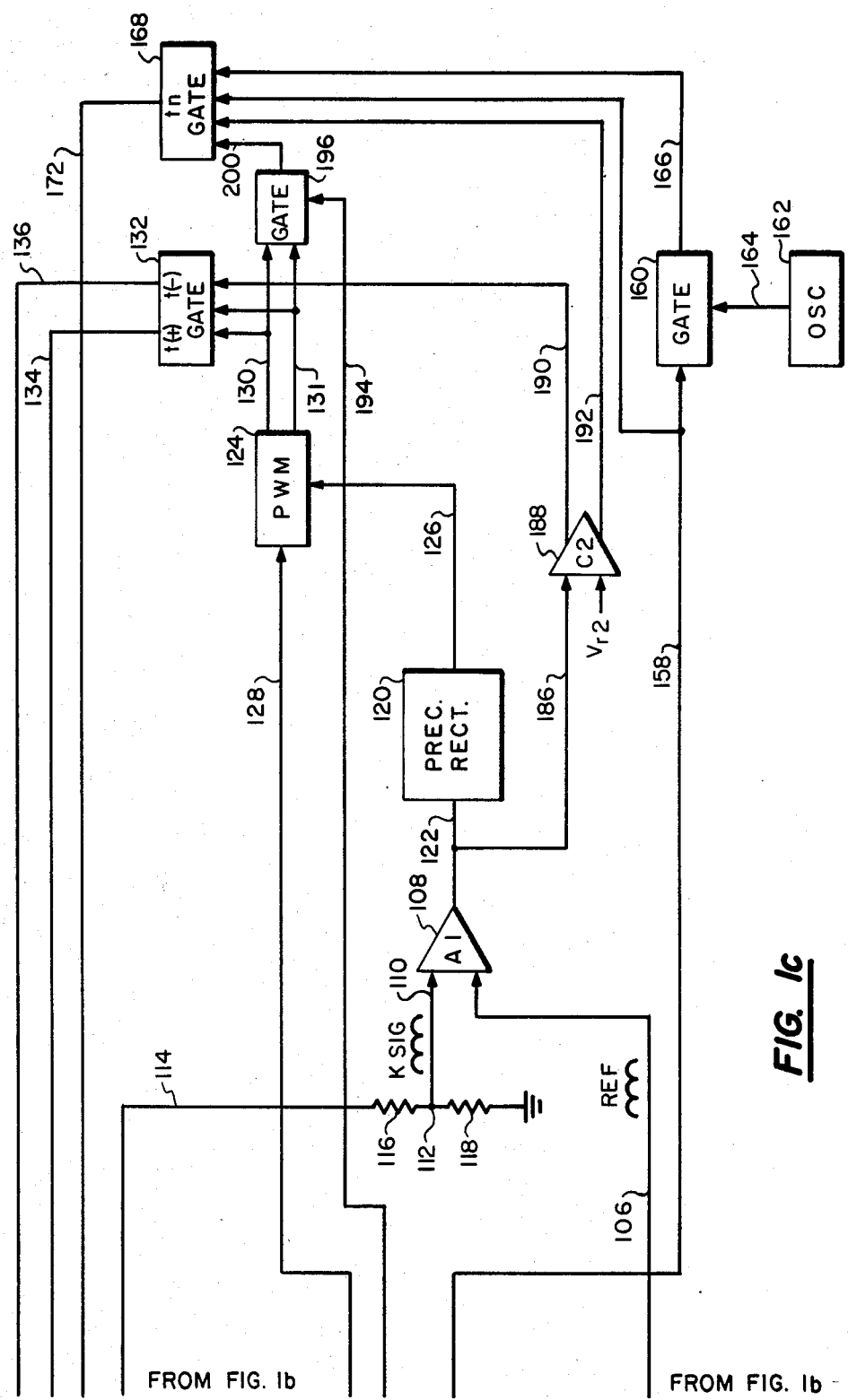

Referring to FIG. 1, there is shown a schematic diagram of the uninterruptible power supply of the present invention. Input AC power is supplied on lines 10 and 12 to terminals A and B of the four-terminal switching network 14. Switching network 14 includes terminals C and D for providing an output therefrom. Switching network 14 includes switching elements 14a, 14b, 14c, and 14d arranged in a bridge configuration. Switching element 14a is coupled between terminals A and C, while switching element 14b is coupled between terminals B and D. Switching element 14c is coupled between terminals B and C while switching element 14d is coupled between terminals A and D. Terminals C and D are respectively coupled to lines 16 and 18 upon which an output waveform is provided from switching network 14. Each of the switching elements 14a, 14b, 14c, and 14d are oriented within switching network 14 by reference points 1 and 2. Switching elements 14a and 14b are controlled by a first switching signal, b(+), for electrically connecting terminal A to terminal C and terminal B to terminal D. Switching elements 14c and 14d are controlled by a second switching signal, b(−), for electrically connecting terminal B to terminal C and terminal A to terminal D. The sequential controlling of switching elements 14a, 14b, 14c and 14d convert an input sinusoidal waveform into a full wave rectified waveform by alternating switching signals b(+) and b(−).

Figure 2A:
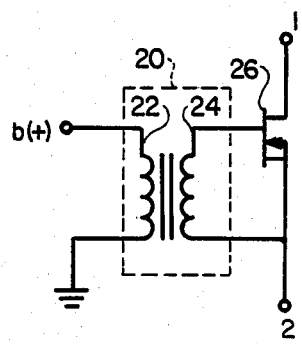
FIG. 2 (a)-2(b) are schematical illustrations of the switches and associated control circuitry associated with the switching networks which provides full wave rectification of the input AC current waveform and demodulation of the full wave rectified current waveforms to sinusoidal current waveforms as output from the uninterruptible power supply.
Figure 2B:
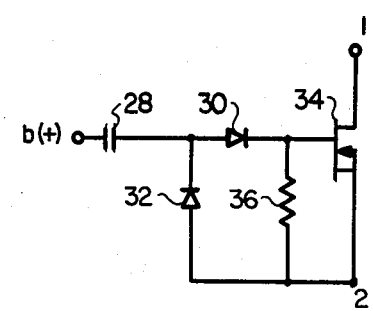

FIG. 2 illustrates two embodiments of the switching elements employed in switching network 14. FIG. 2(a) illustrates an inductively coupled switching element while FIG. 2(b) illustrates a capacitivly coupled switching element. In FIG. 2(a), transformer 20 has one end of primary windings 22 coupled to receive the b(+) signal and the other end coupled to ground. The secondary winding 24 of transformer 20 is coupled between the gate of a field-effect transistor or FET 26 and reference point 2. The drain of FET 26 is coupled to reference point 1 while the source of FET 26 is coupled to reference point 2.

FIG. 2(b) illustrates an alternate embodiment of a switching element having a capacitor 28 coupled between the source of the b(+) signal and the anode of diode 30 and the cathode of diode 32. The cathode of diode 30 is coupled to the gate of FET 34 while the anode of diode 32 is coupled to reference point 2. Resistor 36 is coupled between the cathode of diode 30 and the anode of diode 32. The drain of FET 34 is coupled to reference point 1 and the source is coupled to reference point 2.

Referring to FIG. 1a, the input AC poewr is also supplied on lines 10 and 12 to a diode bridge rectifier 38 which supplies an output full wave rectified waveform of the input AC waveform. The full wave rectified waveform is output from diode bridge 38 on line 40 and is stepped down through a voltage divider comprised of series connected resistors 42 and 44 coupled between line 40 and ground. The output on line 40 is a full wave rectified signal indicative of the frequency and magnitude of the input AC waveform. At nodal point 46 located at the interconnection between resistors 42 and 44, the input source signal, AC SIG, is supplied on line 48 to an input of comparator 50.

The input AC voltage is stepped down through a voltage divider comprised of series connected resistors 42a and 44a coupled between line 12 and ground. Nodal point 46a is coupled by line 52 to a phase locked loop oscillator circuit 54.

The output of oscillator circuit 54 is a sinusoidal waveform phase locked to the reference signal ACR and provided on line 56 to precision rectifier 58. The output of precision rectifier 58 is a full wave rectified waveform of the oscillator output sinusoidal waveform and is provided on line 60 as a reference signal, REF, to the other input of comparator 50.

The output of comparator 50 is coupled on line 62 to network 63. The anode of diode 64 is coupled to line 62 in network 63. The anode of diode 64 is coupled through resistor 66 and capacitor 68 to ground. The anode of diode 64 is also coupled to the input of logic 70 and through resistor 65 to a reference voltage $V_{r1}$. Logic 70 includes therein digital logic circuitry including an inverter coupled to a flip flop.

The output of oscillator circuit 54 is also coupled on line 72 to limiter 74. In response to the output of oscillator circuit 54, limiter 74 provides a pair of reference signals, p(+) and p(−), with the p(−) signal being the inverted signal of the p(+) singal. Limiter 74 provides the p(+) signal on line 76 to logic 80 and 82. Limiter 74 also provides the p(−) signal on line 78 to logic 80 and 82. Logic 80 provides in response to the p(+) signal, a b(+) signal on line 84 to switching elements 14a and 14b. Logic 80 also provides in response to the p(−) signal, a b(−) signal on line 86 to switching elements 14c and 14d. Logic 80 is inhibited from providing the b(+) and b(−) signals to switching network 14 in response to a control signal $I_b$ received from logic 70 on line 84.

Figure 3A:
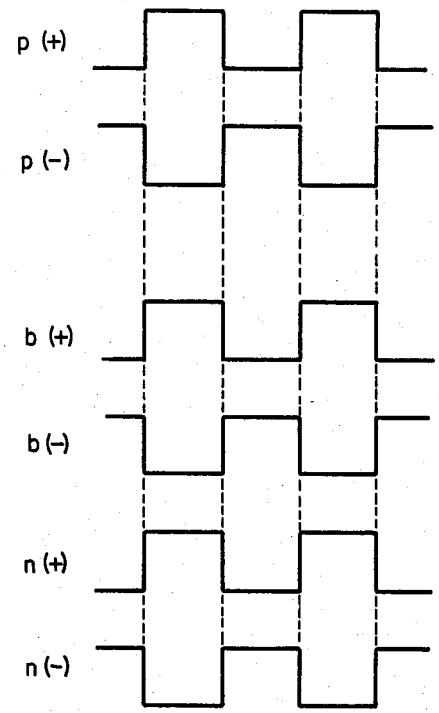
FIG. 3(a)-3(b) illustrate switching control signals generated by the uninterruptible power supply of the present invention.
Figure 3B:
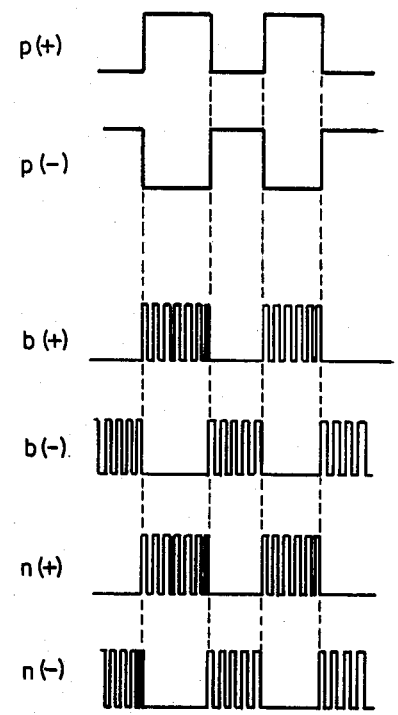

FIG. 3 illustrates the b(+) and b(−); and n(+) and n(−) control signals generated in response to the p(+) and p(−) signals. FIG. 3(a) illustrates the signals associated with the switching elements of FIG. 2(a) while FIG. 3(b) illustrates the signals associated with the switching elements of FIG. 2(b).

Line 16 couples the output of switching network 14 terminal C to switch 88. The output of switch 88 is coupled by line 16a to switching network 90. Switching 88 electrically connects the output of switching network 14 to the input of switching network 90 under the control of logic 70 via a control signal, SW1, on line 92. Switch 88 is preferably either of the two types of switches illustrated in FIG. 2.

Switching network 90 is comprised of the switching elements 90a, 90b, 90c, and 90d arranged in a bridge configuration. Switching elements 90a is coupled between terminals A' and C', while switching element 90b is coupled between terminals B' and D'. Switching element 90c is coupled between terminals B' and C' while switching element 90d is coupled between terminals A' and D'. Terminal C' is coupled by line 16a to the output of switch 88. Terminal D' is coupled to terminal D of switching network 14 by line 18 with line 18 being coupled to ground. Terminals A' and B' provide on lines 94 and 96 the continuous output AC power from the uninterruptible power supply.

Switching elements 90a, 90b, 90c, and 90d are identical to those discussed with reference to FIG. 2 and switching network 14. Switching element 90a and 90b are provided on line 98 a n(+) switching signal from logic 82. Switching elements 90c and 90d are provided with a switching signal n(−) from logic 82 on line 100. The sequential controlling of switching elements 90a, 90b, 90c, and 90d, by switching signals n(+) and n(−), convert the full wave rectified waveform input to switching network 90 into an output sinusoidal waveform.

Oscillator 102 is coupled by line 104 to logic 80 and 82. Oscillator 102 is implemented when switching networks 14 and 90 and switch 88 implement switch elements of the capacitively coupled type, such as illustrated in FIG. 2(b). The b(+) and b(−); n(+) and n(−) are signals as high frequency pulses generated by oscillator 102 and modulated by the signals p(+) and p(−) in logic 80 and 82.

The REF signal is coupled from precision rectifier 58 by line 106 to an input of a differential amplifier 108. The K waveform developed between terminals C' and D' of switching network 90 is stepped down through a voltage divider comprised of resistors 116 and 118 coupled between line 114 and ground. At nodal point 112, located between the interconnection of resistors 116 and 118, the signal K SIG is provided and is coupled by line 110 to the other input of amplifier 108.

Amplifier 108 provides an error signal to precision rectifier 120 on line 122. The output of precision rectifier 120 is provided to pulse width modulator 124 on line 126. Pulse width modulator 124 receives a control signal, PWM, on line 128 from logic 70 which limits the maximum width of output pulses provided by pulse width modulator 124.

The output of pulse width modulator 124 is provided on lines 130, 131 to gate 132. Gate 132 provides signals t(+) and t(−) respectively on lines 134 and 136. The battery inverter circuit includes FET 138 having a FET gate coupled by lines 134 to gate 132 for receiving the t(+) signal and FET 140 having a FET gate coupled by line 136 to gate 132 for receiving the t(−) signal. FETs 138 and 140 are coupeld to transformer 142 by having the drain of each FETs 138 and 140 coupled to an opposite end of primary winding 144 of transformer 142. The source of each FETs 138 and 140 are coupled to ground. The center tap of primary winding 144 is coupled to the positive terminal of battery 145 which has a negative terminal coupled to ground. The secondary winding 146 of transformer 142 is coupled to the input terminals of diode bridge rectifier 148. One of the output terminals of rectifier 148 is coupled to ground while the other output terminal is coupled by line 150 to one end of inductor 152. The other end of inductor 152 is coupled to node 154. Node 154 is coupled to line 114 and one end of capacitor 156. The other end of capacitor 156 is coupled to ground.

An energy recovery circuit is included for charging the battery when in the AC mode of operation and for returning reactive power supplied by a load to the battery when in the battery mode of operation. In the AC mode of operation, a control signal $G_c$ is coupled to logic 70 on line 158 to gates 160 and 168. Oscillator 162 provides high frequency oscillatory signal to gate 160 on line 164. In response to the $G_c$ control signal gate 160 provides high frequency pulses on line 166 to gate 168. Also in response to the $G_c$ control signal, gate 168 permits the high frequency pulses to be output from gate 168 as control signals, $t_n$. The $t_n$ signals are supplied on line 172 to the gate of FET 174. The source of FET 174 is coupled to line 18. The drain of FET 174 is coupled to transformer 176 whih has one end of the primary winding 178 coupled to the drain of FET 174, and the other end coupled to line 16a. Secondary winding 180 of transformer 176 is coupled between ground and the anode of diode 182. The cathode of diode 182 is coupled by line 190 to the positive terminal of battery 145.

The output of amplifier 108 is coupled by line 186 to an input of comparator 188. The other input of comparator 188 is provided with a reference voltage, $V_{r2}$. Comparator 188 provides a gate disable signal on line 190, to gate 132, for inhibiting the outputting from gate 132 the t(+) and t(−) signals. Comparator 188 also provides a gate enable signal on line 192 to gate 168. The gate enable signal provided from comparator 188 permits $t_n$ signals to be output from gate 168.

Logic 70 is coupled by line 194 to gate 196 to provide a control signal $G_d$ to gate 196. The control signal $G_d$ inhibits gate 196 from outputting on line 200 to gate 168, pulses from pulse width modulator 124 provided on lines 130 and 131 to gate 196.

In the AC mode of operation, full input AC power having a sinusoidal waveform is supplied to the UPS on lines 10 and 12. The input waveform undergoes full wave rectification in rectifier 38 which provides an output to resistors 42 and 44 as a full wave rectified waveform. The signal, AC SIG, taken at node 46 between resistors 42 and 44, is proportional to the input recitifed waveform. The signal AC SIG is applied to an input of comparator 50. Phase lock loop oscillator circuit 54 uses the signal AC to generate a 60 Hz frequency, phase locked, reference signal. The output sinusoidal waveform of oscillator circuit 54 is full wave rectified by precision rectifier 58. The output of the precision rectifier 58 is applied ot the other input of comparator 50. The output of comparator 50 is coupled through network 63 to logic 70. When oscillator circuit 54 achieves phase lock to the AC signal, the REF signal applied to comparator 50 is slightly less than the AC SIG signal. In this condition, comparator 50 through network 63 drives logic 70 to a first state.

The output of oscillator circuit 54 is also applied to limiter 78 which provides square wave control signals p(+) and P(−) which are typically at a 60 Hz frequency. Limiter 78 is an axis crossing detector that clips the sinusoidal output waveform of oscillator circuit 54 to give a square wave signal that is amplified to an amplitude compatible with digital logic. An inverter is provided in limiter 78 to provide the inverted p(−) signal of the non-inverted p(+) signal. The p(+) and p(−) signals are applied to logic 80 ane 82. In response to the p(+) and p(−) signals, logic 80 generates the b(+) and b(−) signals which are provided to switching network 14. Logic 82 provides the n(+) and n(−) signals which are provided to switching network 90. FIG. 3(a) illustrates the relationship between the p(+) and p(−), b(+) and b(−), and n(+) and n(−) signals.

Switching network 14 includes switching elements 14a 14b, 14c, and 14d with switching elements 14a and 14b responsive to the b(+) signal and switching elements 14c and 14d responsive to the b(−) signal. Switching elements 14a, 14b, 14c, and 14d are arranged in a bridge configuration and are turned on in a predetermined sequence.

During the time when the p(+) signal is high and the p(−) signal is low, switching elements 14a and 14b are conducting and switching elements 14c and 14d are nonconducting. During the time when the p(−) signal is high and the p(+) signal is low, switching elements 14c and 14d are conducting and switching elements 14a and 14b are non-conducting. Since the p(+) and p(−) signals are generated in response to the output of oscillator circuit 54, which is synchronized with the input AC waveform, the p(+) signal occurs when the input AC waveform is positive on line 10 with respect to line 12. During the positive portion of the input AC waveform the b(+) and b(−) signals go respectively high and low in response to the high p(+) signal and the low p(−) signal. This causes switching elements 14a and 14b to conduct with switching elements 14c and 14d non-conducting so as to place terminal C positive with respect to terminal D. Alternatively, when the p(−) signal goes high in response to the input AC waveform going negative on line 10 with respect to line 12. During the negative portion of the input AC waveform, the b(+) signal goes low and the b(−) signal goes high. With the b(+) signal low, switching elements 14a and 14b are non-conducting while switching elements 14c and 14d in response to the high b(−) signal are conducting. With switches 14c and 14d conducting during the negative portion of the input waveform, terminal D is more negative than terminal C. Hence during a complete cycle of the input waveform, the waveform appearing at terminal C with respect to terminal D is the full wave rectified waveform K.

In the AC mode of operation switch 88, which may be of a type similar to those illustrated in FIG. 2, is in the conducting state in response to the SW1 signal from logic 70. With switch 88 conducting, terminals C and D of switching network 14 are respectively electrically connected to terminals C' and D' of switching network 90.

Switching network 90 includes switching elements 90a and 90b that are responsive to the n(+) signal and switching elements 90c and 90d which are responsive to the n(−) signal. The n(+) signal is provided on line 98 from logic 82 while the n(−) signal is provided on line 100 from logic 82. Switching elements 90a, 90b, 90c, and 90d are in a bridge configuration and are turned on in a predetermined sequence. Since the n(+) and n(−) signals are sychronized with the p(+) and p(−) signals, as were the b(+) and b(−) signals, synchronization between switching networks 14 and 90 is achieved.

During the time the p(+) signal is high, the n(+) signal is also high, therefore causing switches 90a and 90b to conduct. Corresponding, the p(−) signal is low resulting in the n(−) signal also being low thereby causing switching elements 90c and 90d to be non-conducting. This causes terminal A' to be electrically connected with terminal C' and terminal B' to be electrically connected to terminal D'. This places a positive waveform on line 94 with respect to line 96.

When the p(−) signal goes high and the p(+) signal goes low, logic 82 provides the n(−) signal going high and the n(+) signal going low which causes switching elements 90c and 90d to conduct while switching elements 90a and 90b are non-conducting. With switching elements 90c and 90d conducting and 90a and 90b non-conducting, terminal A' is electrically connected to terminal D' and terminal B' is electrically connected to terminal C'. This places the positive waveform on line 96 with respect to line 94 which results in a negative waveform on line 94 with respect o line 96.

Figure 4:
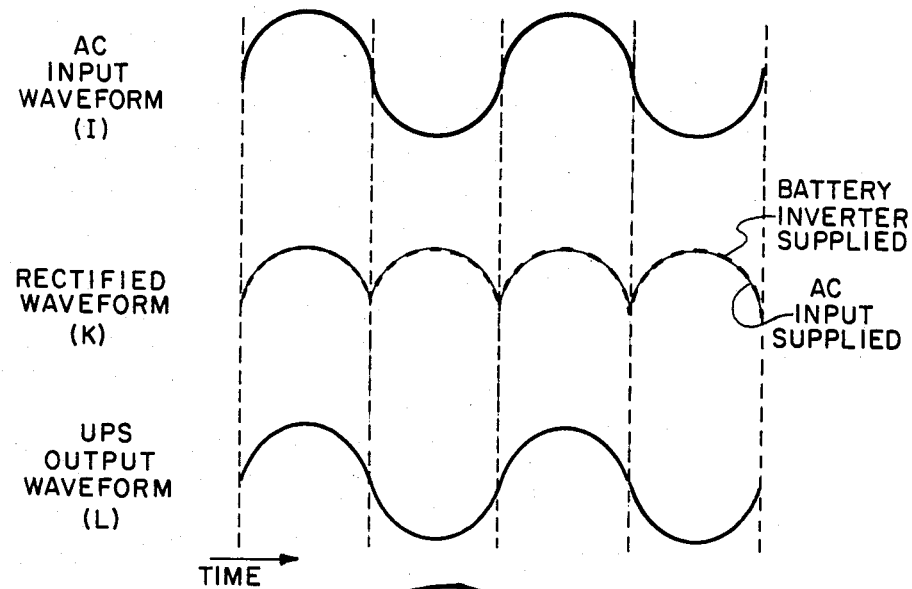
FIG. 4 illustrates waveforms existing in the uninterruptible power supply of the present invention.

Since the p(+) and p(−) signals are references for switching signals in both switching networks 14 and 90, the input AC waveform appearing across terminals A and B of switching network 14 is substantially identical to the output AC waveform appearing aross terminals A' and B' of switching network 90. In summary, the correlated switching action of switching networks 14 and 90 results in an input AC waveform, I, being full wave rectified by switching network 14 to provide the full wave rectified waveform K. The waveform K is demodulated as a full sinewave output, L, from switching network 90. FIG. 4 illustrates the relationship between the waveforms I, K, and L.

In the AC mode of operation, the battery inverter is supplying approximately 1% of the nominal output power from the uninterruptible power supply. This feature is accomplished by applying the REF signal to one input of amplifier 108. The other input of amplifier 108 is a divided down signal from the waveform K and is referred to as K SIG. The output of amplifier 108 is applied to precision rectifier 120 to ensure a positive error signal is output from precision rectifier 120. The output of the precision rectifier 120 is coupled to pulse width modulator 124. Logic 70 provides a control signal, PWM, via line 128 to pulse width modulator 124 so as to limit the width of pulse output from pulse width modulator 124 so that the battery inverter circuit provides only 1% of the total output power.

The output of pulse width modulator 124 is input to gate 132 so as to provide the signals t(+) and t(−). The t(+) and t(−) signals are pulses of different widths, varying in a sinusoidal pattern, such that the output from the battery inverter will be full-wave rectified and conditioned to provide the K signal.

Figure 5B:
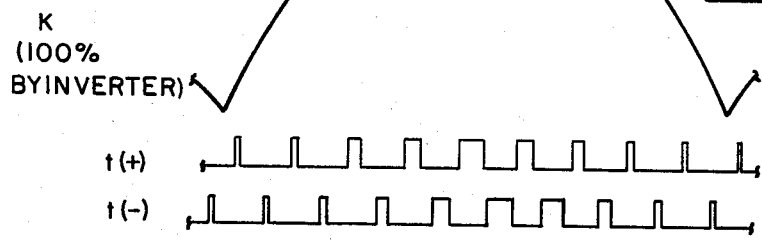
FIG. 5(a)-5(b) illustrates waveforms and corresponding control signals associated with the battery inverter.
Figure 5A:
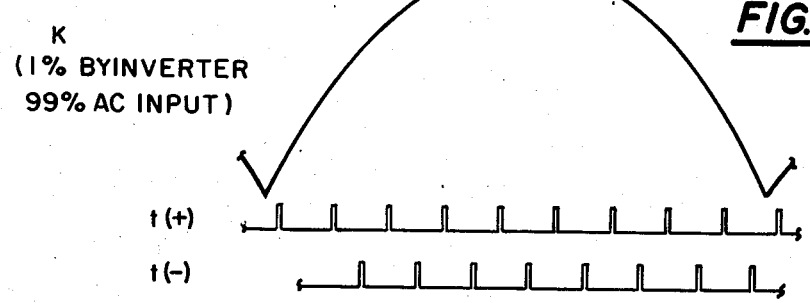

FIG. 5 illustrates the varying pulses widths of the pulses output from pulse width modulator and the corresponding K waveform output from the battery inverter and associated filter circuit. FIG. 5(a) illustrates the K waveform and output pulses from the pulse width modulator 124 when limited by the PWM signal (AC mode). FIG. 5(b) illustrates the K waveform and output pulses from pulse width modulator when not limited by the PWM signal (battery mode). The resulting t(+) and t(−) signals are at a typical pulse repetition rate of 60 kHz so as to produce a corresponding 120 Hz K waveform.

Referring to FIG. 1, FETs 138 and 140 conduct in response to the signals t(+) and t(−) with FETs 138 and 140 driving the primary winding 144 of transformer 142. The voltage developed across primary winding 144 is stepped up to a suitable amplitude in secondary winding 148 to be full-wave rectified with rectifier 148 and filtered by inductor 152 and capacitor 156 to provide the K waveform.

The REF signal, phase locked with the input AC waveform, and the feedback signal K SIG, indicative of the K waveform, determine the pulse width of the signals t(+) and t(−). FIG. 5(b) illustrates the varying pulse width of the output pulses from pulse width modulator that determine the shape of the waveform appearing at node 154.

While in the AC mode of operation, logic 70 supplies a control signal $G_d$ on line 194 that disables gate 196 so as to inhibit pulses, output from pulse width modulator 124, from being transmitted to gate 168. In addition, logic 70 supplies a control signal, $G_c$, on line 158 to gates 160. This $G_c$ signal enables gate 160 to provide pulses from oscillator 162 to gate 168 via line 166. The control signal $G_c$ enables gate 168 to permit the pulses from gate 160 to be output from gate 168 as the control signals, $t_n$ 172 to an energy recovery circuit or in the AC mode, a battery charger circuit.

In relation to the energy recovery circuit, line 172 is coupled to the FET gate of FET 172 which is turned on and off at a high frequency in response to the $t_n$ signals. The high frequency turning on and off of FET 174 permits high frequency current to flow through primary winding 178 of transformer 176. This high frequency current in the primary winding 178 is electromagnetically coupled to secondary winding 180 of transformer 176. A high frequency current is developed in secondary winding 180 which flows through diode 182 and on line 184 to the battery. The current flowing to the battery in the AC mode charges the battery.

In the event of a sudden loss of input AC power, or the input AC line voltage drops below approximately 105 volts, or the input power makes phase transitions that would prove potentially damaging to equipment coupled to the output of the UPS, the UPS goes into the battery mode of operation. Irregularities and transients in the input power is reflected in the AC SIG applied to comparator 50. These discrepancies in the input power cause AC SIG to fall below the REF signal and in response comparator 50 and the associated network 63 causes logic 70 to change to a second state. Changing of logic 70 to the second state causes the battery inverter to supply 100% of the output power while also disabling the input AC power line from supplying any UPS output power. The battery inverter supplies the same amount of output power to the load that the AC input line was supplying at the time the UPS switched to the battery mode of operation. Logic 70 removes the SW1 signal on line 92 which causes switch 88 to open or become non-conducting. Switch 88 is utilized to assure complete decoupling of the input AC power from the UPS due to the inherent diode effect in switching elements such as FET transistors. In addition, the opening of switch 88 prevents the battery inverter from supplying power to the input AC power line.

Logic 70 removes the PWM signal on line 128 to permit pulse width modulator 124 unlimited pulse width modulation of the output pulses. Logic 70 removes the $G_c$ signal from line 158 so as to inhibit the battery charging pulses from oscillator 162 from being transmitted through gate 160 to gate 168. Logic 70 provides a $I_b$ signal on line 84 to logic 80 which inhibits logic 80 from outputting the b(+) and b(−) signals to switching network 14.

Logic 70 provides on line 194 the control signal $G_d$ to gate 196 which enables gate 196. With gate 196 enabled, output pulses from pulse width modulator 124 are transmitted through gate 196 on line 200 to gate 168. In response to the removal of the control signal $G_c$ from gate 168, gate 168 is disabled from outputting pulses from pulse width modulator on line 172 to the energy recovery circuit. The control signal $G_d$ and the removal of the $G_c$ control signal sets up the energy recovery circuit of the UPS for dealing with reactive power as returned from the load to the UPS.

Since the PWM signal is removed from pulse width modulator 124, the width of pulses t(+) and t(−) are not limited. Therefore, the inverter circuit comprised of FET 138 and 140 and transformer 142 provide a waveform to rectification and filter network, i.e., rectifier 148, inductor 152 and compacitor 156, so as to provide the full wave rectified waveform K at full 100% power output. The output power in the battery mode is the same amount of output power in the AC mode prior to the loss of input AC power. Since the control of switching network 90 with reference to the output of oscillator circuit 54, there is no change in the output demodulation of the K waveform as fully provided by the battery inverter circuit.

The width of the pulses output from pulse width modulator 124 are dictated by the error signal generated by amplifier 108 in response to the comparison of the REF signal and the K SIG signal. The error signal provides the appropriate wave shape that will generate from the battery inverter a sinusoidal waveform. If while in the battery mode of operation the K SIG signal becomes larger than the REF signal it is an indication that the reactive power is being returned from the load to the UPS. For example, when the input power is supplied from the AC power line switch 88 is conducting and switching networks 14 and 90 are operating. In the AC mode of operation, any current returning from a reactive load will have a path directly back to the power line. However, when the input power is provided solely by the battery inverter, the reactive power must be eliminated so as to not disturb the shape of waveform K. This is solved by using the energy recovery circuit to return the energy supplied by the reactive load to the battery.

The operation of the energy recovery circuit in the battery mode is explained as follows. When the K SIG signal becomes greater than the REF signal, the magnitude of the error signal output from amplifier 108 and input to comparator 188 becomes greater than the reference voltage $V_{r2}$ which is coupled to the other input of comparator 188. In this event, comparator 188 provides a gate disable signal on line 190 to gate 132 so as to inhibit the outputting of the t(+) and t(−) pulses from gate 132. Comparator 188 also provides on line 192 a gate override signal on line 192 to gate 168. In response to this gate enable signal, Hence, the $t_n$ signals are essentially high frequency pulses output from the pulse width modulator.

The $t_n$ signals are applied to the gate of FET 174 so as to turn on and off FET 174. When FET 174 is turned on, current is conducted through primary winding 178 of transformer 176. The electromagnetically coupled secondary winding 180 develops a current which is coupled through diode 182 and on line 184 to battery 145. The high frequency current pulses are filtered out by capacitor 156 such that the low frequency poewr is a clean K waveform. Thus, any reactive power returned from the output load will be returned to the battery, the source of energy for this output.

As the input AC voltage returns to a level above a predetermined point such as 105 volts, oscillator circuit 54 changes in phase at a zero crossings to become in phase with the input AC waveform. In response to the restoration of AC power to the specified level, the output of comparator 50 in conjunction with network 63 enables logic 70 to return to the first state upon the next zero crossing of the oscillator circuit output waveform. This results in resumed operation of switching network 14, the conduction of switch 88 and the limiting of the pulse width modulator ouptut.

Oscillator 102 provides an output signal on line 104 to logic 70, 80 and 82 so that the SW1 signal, the b(+) and b(−) signal, and the n(+) and n(−) signals are modulated high frequency pulses. The SW1 signal modulates in logic 70 the high frequency signal provided to switch 88. The p(+) and p(−) signals modulate in logic 80 and the b(+) and b(−) signals. The p(+) and p(−) signals modulate in logic 82 the n(+) and n(−) signals. Oscillator 102 is used in association with the capacitive switching elements, illustrated in FIG. 2(b) and utilized in switching networks 14 and 90 and switch 88. Oscillator 102 typically provides an output signal having a frequency of 1 MHz. FIG. 3B illustrates the high frequency pulses modulated as the b(+) and b(−), and n(+) and n(−) signals.

Although the previous description of the preferred embodiments discuss the use of FET transistors as switches it is readily apparent that bipolar transistors are equally suited for this purpose. In addition, switching network 14 may be suitably replaced with a diode bridge rectifier so as to eliminate the requirement of logic 80.

The previous description of the preferred embodiments are provided to enable any person skilled in the art to make or use the present invention. Various modifications to these embodiments will be readily apparent to those skilled in the art, and the generic principles defined herein may be applied to other embodiments without the use of the inventive facility. Thus, the present invention is not intended to be limited to the embodiments shown herein but is to be accorded the widest scope consistant with the principles and novel features disclosed herein.

What is claimed is:

1. An apparatus for supplying continuous output power from at least one of two sources of input power comprising;
   rectification means for converting an input alternating current from a first source of input power, into a first unidirectional current, said first unidirectional current varying in magnitude with time;
   first sense means responsive to the voltage provided by said first source of input power for providing a first control signal when the voltage provided by said first source of input power is within a predetermined range of voltages and providing a second control signal when the voltage provided by said first source of input power is at a voltage other than a voltage within said predetermined range of voltages, said second control signal inhibiting said rectification means for providing said first unidirectional current;
   inverter means for converting an input direct current from a second source of input power into a second unidirectional current, said second unidirectional current varying in magnitude with time;
   second sense means responsive to said first and second control signals for providing a third control signal to said inverter means so as to control the time-varying magnitude of said second unidirectional current provided by said inverter means, said second sense means in response to said first control signal providing said third control signal so as to limit the magnitude of said second unidirectional current to a magnitude substantially less than said first unidirectional current and said second sense means in response to said second control signal providing said third control signal so as to control the magnitude of said second unidirectional current to a magnitude sufficient to maintain continuous output power; and
   demodulator means for converting at least one of said first or second unidirectional currents into a continuous output alternating current so as to maintain continuous output power.

2. The apparatus of claim 1 further comprising energy recovery means responsive to said first control signal for providing energy from said first unidirectional current to said second source of input power.

3. The apparatus of claim 2 wherein said energy recovery means is responsive to said second control signal and a fourth control signal for providing energy from a current, returned from a reactive load coupled to the output of said demodulator means, to said second source of input power, said fourth control signal provided by said second sense means in response to the current returned from said reactive load.

4. The apparatus of claim 1 wherein said rectification means provides full wave rectification of said input alternating current, said rectification means comprising:
a diode bridge having first and second terminals for receiving an input alternating current waveform and third and fourth terminals for outputting said first unidirectional current, said first unidirectional current having a waveform corresponding to a full wave rectification of the waveform of said input alternating current; and
means connected to said diode bridge for electrically disconnecting said first unidirectional current from said demodulator means in response to said second control signal.

5. The apparatus of claim 1 wherein said rectification means comprises a switching network having first and second terminals for receiving said input alternating current and third and fourth terminal for outputting said first unidirectional current, said first unidirectional current having a waveform corresponding to a full wave rectification of the waveform of said input alternating current, including:
(a) first switch means responsive to a first switch signal for electrically connecting said first terminal to said third terminal,
(b) second switch means responsive to said first switch signal for electrically connecting said second terminal to said fourth terminal,
(c) third switch means responsive to a second switch signal for electrically connecting said first terminal to said fourth terminal,
(d) fourth switch means responsive to said second switch signal for electrically connecting said second terminal to said third terminal; and
wherein said first sense means includes means for generating said first and second switch signals.

6. The apparatus of claim 5 further comprising means connected to said switching network for electrically disconnecting said first unidirectional current from said demodulator means in response to said second control signal.

7. The apparatus of claim 5 wherein said first sense means inhibits the generation of said first and second switch signals when the voltage provided by said first source of input power is at a voltage other than a voltage within said predetermined range of voltages.

8. The apparatus of claim 1 wherein said first sense means comprises:
conversion means for providing an input reference signal representative of the voltage provided by said first source of input power;
reference means for generating an internal reference signal; and
comparison means coupled to said reference means and said conversion means for comparing said input reference signal with said internal reference signal so as to generate said first and second control signal.

9. The apparatus of claim 1 wherein said inverter means comprises:
switch signal means coupled to said second sense means and responsive to said third control signal for generating first and second switch signals;
electromagnetic coupling means coupled to said switch signal means and adapted to receive said input direct current for converting said input direct current into pulses of energy in response to said first and second switch signal; and
conditioning means coupled to said electromagnetic coupling means for converting said pulses of energy into said second unidirectional current.

10. The apparatus of claim 8 wherein said second sense means comprises:
second comparison means coupled to said rectification means, said inverter means, and said reference means for comparing said internal reference signal with a reference voltage representative of the voltage corresponding to at least one of said first and second unidirectional currents, and for providing a comparison signal; and
modulating means coupled to said comparison means and said first sense means for providing said third control signal in response to said comparison signal, said modulating means responsive to said first control signal for modifying said third control signal so as to restrict the magnitude of said second unidirectional current.

11. The apparatus of claim 1 wherein said demodulator means comprises a switching network having first and second terminals coupled to said rectification means and said inverter means for receiving at least one of said first and second unidirectional currents, and third and fourth terminals for outputting said continuous output alternating current, including:
(a) first switch means responsive to a first switch signal for electrically connecting said first terminal to said third terminal,
(b) second switch means responsive to said first switch signal for electrically connecting said second terminal to said fourth terminal,
(c) third switch means responsive to a second switch signal for electrically connecting said first terminal to said fourth terminal,
(d) fourth switch means responsive to said second switch signal for electrically connecting said second terminal to said third terminal, and
wherein said first sense means generates said first and second switch signals.

12. An uninterruptible power supply for supplying continuous output power from at least one of two sources of input power, comprising:
a first four-terminal switching network having first and second terminals for receiving an input alternating current from a first source of input power and third and fourth terminals for outputting a first unidirectional current having a waveform coresponding to a full wave rectification of the waveform of said input alternating current, including:
(a) first switch means responsive to a first switch signal for electrically connecting said first terminal to said third terminal,
(b) second switch means responsive to said first switch signal for electrically connecting said second terminal to said fourth terminal,
(c) third switch means responsive to a second switch signal for electrically connecting said first terminal to said fourth terminal, and
(d) fourth switch means responsive to said second switch signal for electrically connecting said second terminal and said third terminal;
conversion means coupled to said first and second terminals for providing an input reference signal representative of the voltage provided by said first source of input power;

reference means coupled to one of said first and second terminals for generating a pair of internal reference signals, said pair of reference signals have a waveform phase-locked with the waveform of the voltage provided by said first source of input power;

first comparison means coupled to said reference means and said conversion means for comparing said input reference signal with one of said internal reference signals and generating a first control signal when said input reference signal has a first predetermined relationship with one of said internal said reference signals and generating a second control signal when said input reference signal has a second predetermined relationship with said one of said internal reference signals;

first switch signal means coupled to said reference means, said first comparison means, and said first switching network for generating said first and second switch signals in response to the other of said internal reference signals, said first signal means inhibited from generating said first and second switch signals in response to said second control signal;

second switch signal means coupled to said reference means for generating third and fourth switch signals in response to said other of said internal reference signals;

a second four-terminal switching network, coupled to said second switch means, having fifth and sixth terminals electrically connected to said third and fourth terminals and seventh and eight terminals for outputting a continuous output alternating current, including:

(a) fifth switch means responsive to said third switch signal for electrically connecting said fifth terminal to said seventh terminal, (b) sixth switch means responsive to said third switch signal for electrically connecting said sixth terminal to said eighth terminal, (c) seventh switch means responsive to said fourth switch signal for electrically connecting said fifth terminal to said eighth terminal, and (d) eigth switch means responsive to said fourth switch signal for electrically connecting said sixth terminal to said seventh terminal;

second comparison means coupled to said second switching network and said reference means for comparing said one of said internal reference signals with a reference voltage representative of the voltage corresponding to at least one of said first or a second unidirectional currents and for generating a third control signal;

modulating means coupled to said first and second comparison means for providing a fourth control signal in response to said third control signal, said modulating means responsive to said first control signal for modifying said fourth control signal so as to restrict the magnitude of said second unidirectional current;

third switch signal means coupled to said modulating means for generating fifth and sixth switch signals in response to said fourth control signal;

first electromagnetic coupling emans coupled to said third switch means for receiving said input direct current from said second source of input power and for converting said input direct current into electromagnetically induced pulses of energy in response to said fifth and sixth switch signals; and conditioning means coupled to said electromagnetic converting means and said third and fourth terminals for converting said electromagnetically induced pulses of energy into said second unidirectional current.

13. The uninterruptible power supply of claim 12 further comprising:

gating means coupled to said first and second comparison means and said modulating means, said gating means responsive to said first control for generating a fifth control signal and responsive to said second, third, and fourth control signals for generating a sixth control signal; and second electromagnetic coupling means coupled to said second switching network and said gating means for transferring energy in said first unidirectional current to said second source of input power in response to said fifth control signal and for transferring energy returned from a reactive load, which receives said continuous output alternating current, to said second source of input power in response to said sixth control signal, said sixth control signal inhibiting said third switch means from generating said fifth and sixth switch signals.

14. The uninterruptible power supply of claim 12 further comprising decoupling means coupled between said first and second switching network and said first comparison means for electrically disconnecting said first unidirectional current from said second switching network in response to said second control signal.

15. The uninterruptible power supply of claim 12 wherein each one of said first, second, third, fourth, fifth, sixth, seventh, and eighth switch means include:

a field-effect transistor having a gate, source and drain, said source and drain coupled between a selected pair of said first, second, third, and fourth terminals; and first and second electromagnetically coupled coils, one end of said first coil for receiving a selected one of said first, second, third and fourth switch signals, the other end of said first coil coupled to ground, one end of said second coil coupled to said source and the other end of said second coil coupled to said gate.

16. The uninterruptible power supply of claim 12 wherein each one of said first, second, third, fourth, fifth, sixth, seventh, and eighth switch means includes:

a field effect transistor having a gate, source and drain, said source and drain coupled between a selected pair of said first, second, third, and fourth terminals; and a capacitor having one end for receiving a selected one of said first, second, third and fourth switch signals, the other end of said capacitor coupled to the cathode of a first diode and the anode of a second diode, the anode of said first diode coupled to said source, the cathode of said second diode coupled to said gate, and a resistor coupled between said source and gate.

17. The uninterruptible power supply of claim 16 further comprising osciallator means coupled to said first and second switch signal means for providing a continuous oscillatory signal of a predetermined frequency to said first and second switch signal means, said first and second switch means modulating said oscillatory signal so as to provide each of said first, second, third and fourth switch signals as a burst of osciallations at said predetermined frequency.

18. A method for supplying continuous output power from at least one of two sources of input power comprising the steps of:
rectifying an input alternating current from a first source of input power into a first unidirectional current, said first unidirectional current varying in magnitude with time;
generating a reference signal in response to said input alternating current;
generating a first control signal when the voltage provided by said first source of input power is within a predetermined range of voltages;
generating a second control signal when the voltage provided by said first source of input power is at a voltage other than a voltage within said predetermined range of voltages;
inhibiting said first unidirectional current in response to the generation of said second control signal;
converting an input direct current from a second source of input power into a second unidirectional current, said second unidirectional current varying in magnitude with time;
restricting the magnitude of said second unidirectional current in response to the generation of said first control signal; and
demodulating at least one of said first and second unidirectional currents into a continuous output alternating current so as to maintain continuous output power.

19. The method of claim 18 further comprising the step of:
providing energy from said first unidirectional current to said second source of input power in response to the generation of said first control signal.

20. The method of claim 18 further comprising the step of:
providing energy from a return current, returned from a reactive load receiving said output alternating current, to said second source of input power.

21. The method of claim 18 further comprising the steps of:
providing energy from said first unidirectional current to said second source of input power in response to the generation of said first control signal; and
providing energy from a return current, returned from a reactive load receiving said output alternating current, to said second source of input power.

22. The method of claim 18 further comprising the steps of:
providing energy from said first unidirectional current to said second source of input power in response to the generation of said first control signal;
sensing a return current returned from a reactive load receiving said output alternating current; and
providing energy from said return current to said second source of input power in response to the sensing of said return current.

* * * * *